Figure 1:
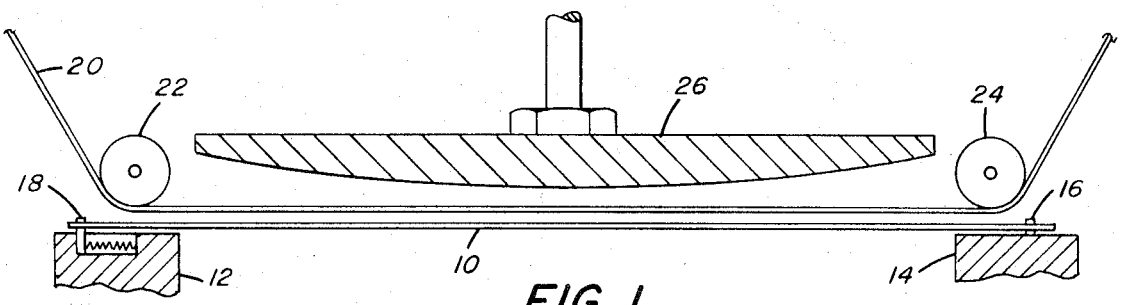
Figure 2:
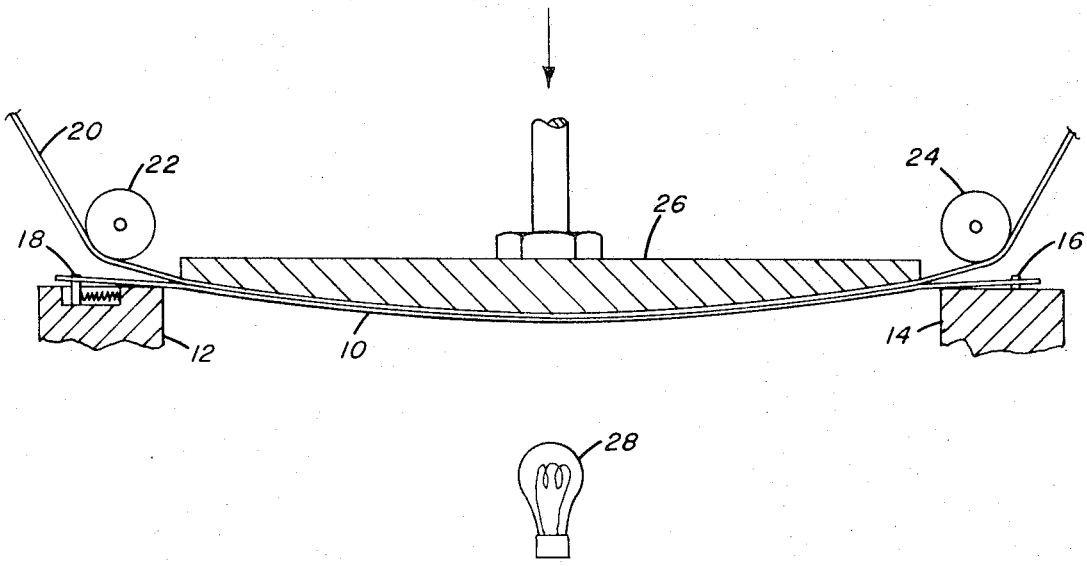

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1323

T883,021
SUSPENDED NEGATIVE CONTACT PRINTING

James V. Nealon, 208 Winona Blvd.,
Rochester, N.Y. 14617

Filed Oct. 13, 1969, Ser. No. 865,586
Int. Cl. G03b *27/02*
U.S. Cl. 355—78
1 Sheet Drawing. 4 Pages Specification

Photographic contact prints, without Newton rings, and with minimum dirt defects, are produced by tensioning (16, 18) a negative (10) to be printed between supports (12, 14). The photographic print material (20) on which the copy is to be made is held above the negative (10). And a curved pressure pad or shoe (26) is applied to bow the negative (10) and print material (20) intimately together. While such bowing takes place, a lamp (28) is excited to expose the print material (20) through the negative (10).

Feb. 23, 1971 J. V. NEALON T883,021

SUSPENDED NEGATIVE CONTACT PRINTING

Filed Oct. 13, 1969

JAMES V. NEALON
INVENTOR.

Walter O. Hodsdon
BY
Robert F. Cody
ATTORNEYS